United States Patent [19]

Hiestand

[11] Patent Number: 4,951,535
[45] Date of Patent: Aug. 28, 1990

[54] APPARATUS FOR ACTUATING THE CLAMPING JAWS OF A CHUCK

[75] Inventor: Karl Hiestand, Pfullendorf, Fed. Rep. of Germany

[73] Assignee: SMW Schneider & Weisshaupt GmbH, Meckenbeuren, Fed. Rep. of Germany

[21] Appl. No.: 263,823

[22] Filed: Oct. 28, 1988

[30] Foreign Application Priority Data

Nov. 3, 1987 [DE] Fed. Rep. of Germany ....... 3737190

[51] Int. Cl.$^5$ ............................................. B23B 31/26
[52] U.S. Cl. ..................... 82/142; 279/1 H; 279/112
[58] Field of Search ................ 279/1 H, 110, 112; 82/142

[56] References Cited

U.S. PATENT DOCUMENTS

| 2,006,621 | 7/1935 | Berg | 279/1 H |
|---|---|---|---|
| 2,186,504 | 1/1940 | Sloan et al. | 279/1 H |
| 4,758,006 | 7/1988 | Hiestand | 279/1 H |

FOREIGN PATENT DOCUMENTS 1552302 10/1969 Fed. Rep. of Germany .

Primary Examiner—Z. R. Bilinsky
Attorney, Agent, or Firm—Robert W. Becker

[57] ABSTRACT

An apparatus for actuating clamping jaws of a chuck via an adjustment member that, to produce a rotational adjustment movement, is drivingly connected with an actuator formed from a reversible drive motor and a subsequent gear mechanism that is drivingly connected to the output side of the motor via a torque coupling. The gear mechanism is embodied as a two-stage synchronized gear in the form of a transmission gear drive having central gears that are rotatably mounted within one another and are drivingly connected via a step-type gearing to a drive member of the chuck and to the adjustment member. The central gears are drivingly and synchronously coupled via two transmission gears fixedly disposed on a transmission shaft that is rotatable about the central gears and engages the torque coupling in a load-dependent manner. The reduction stages of the transmission gear drive correspond to transmission stages of the step-type gearing.

12 Claims, 3 Drawing Sheets

APPARATUS FOR ACTUATING THE CLAMPING JAWS OF A CHUCK

BACKGROUND OF THE INVENTION

1. Field of the Invention

The present invention relates to an apparatus for actuating or controlling the clamping jaws of a heavy-duty or power chuck disposed on a shop machine The clamping jaws are radially displaceably guided in a driven chuck body and are coupled via splined rods, keyways, levers, or similar connecting members with a rotatable or axially shiftable adjustment member. To produce a rotational adjustment movement, this adjustment member is drivingly connected with an actuator that is formed from a stationary reversible electric motor and a gear mechanism that is drivingly connected to the output side of the motor via a torque coupling.

2. Description of the Prior Art

German Offenlegungsschrift No. 15 52 302 Giraud et al dated Oct. 23, 1969 discloses an actuating apparatus of this general type. To produce the rotational movements that bring about the adjustment movements of the clamping jaws, this heretofore known apparatus is provided with a reduction gear mechanism in the form of a planetary-type differential gearing that is connected with the drive motor via a magnetic powder coupling. During normal extended operation of the turning machine, the drive motor is turned off and the drive pinion of the planetary-type differential gearing is uncoupled from this motor. However when a workpiece is being secured or removed, with the machine spindle stopped, the drive pinion is rotated by the drive motor, so that the clamping jaws can be appropriately adjusted via a helix.

Although during normal operation, with the coupling engaged, a readjustment movement of the clamping jaws could also be undertaken, in this operating state the drive motor must rotate in the same direction of rotation as does the machine spindle, and the adjustment member that is connected with the clamping jaws must be driven at a higher speed than is the machine spindle. The speed differentials between the two halves of the coupling are therefore extremely high with this known apparatus, and are no longer controllable.

It is therefore an object of the present invention to improve an apparatus of the aforementioned general type so that the drive motor of the actuator, in order to maintain the clamping force and at the same time undertake a retightening if needed, can constantly rotate at a constant speed and direction of rotation that are independent of the speed and rotation of the machine spindle, thereby always delivering a uniform torque. Furthermore, it should be possible to undertake the clamping and release of a workpiece by changing the direction of rotation of the actuator motor in a simple manner; it should also be possible to adjust the clamping force that acts upon the workpiece without difficulty. The capital investment necessary to realize this should be kept low, so that an economical manufacture and a compact construction can be realized.

BRIEF DESCRIPTION OF THE DRAWINGS

These and other objects and advantages of the present invention will appear more clearly from the following specification in conjunction with the accompanying schematic drawings, in which.

SUMMARY OF THE INVENTION

Figure 1:
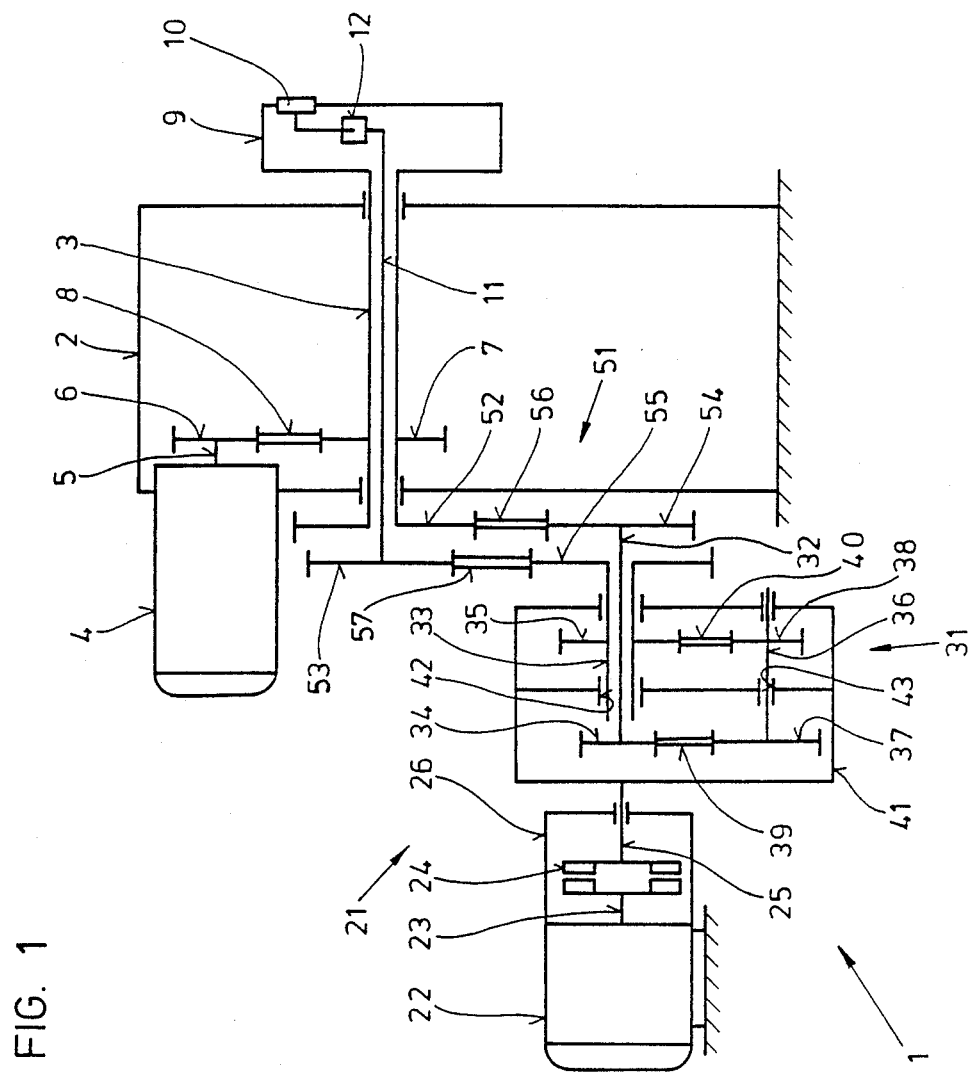
FIG. 1 is a view that shows a turning machine that is provided with an actuator formed from a drive motor, a transmission gear drive, and a step-type gearing.

The apparatus of the present invention is characterized primarily in that the gear mechanism is embodied as a two-stage synchronized gear in the form of a transmission or reduction gear drive having central gears that are rotatably mounted within one another and are drivingly connected via a step-type gearing to a drive member of the chuck and to the adjustment member, which is coupled with the clamping jaws: the central gears of the transmission gear drive are drivingly and synchronously coupled via two transmission gears that are fixedlY disposed on a transmission shaft of the transmission gear drive, with this transmission shaft being mounted in such a way as to be rotatable about the central gears, and engaging, in a load-dependent manner, a drive member of the torque coupling and/or said drive motor, either directly or via an intermediate member; the central and transmission gears of the transmission gear drive form reduction stages that correspond to transmission stages of the following step-type gearing.

In this connection, it is expedient to rotatably support the transmission shaft in a rotatably mounted housing, a U-shaped bracket, or the like as an intermediate member, which is drivingly connected with the drive member of the torque coupling.

The drive motor of the actuator should be disposed in the axial direction of the main shaft of the transmission gear drive.

The central gears and the transmission gears of the transmission gear drive, as well as the following step-type gearing, can be formed by pulleys and toothed or flat belts that extend thereover. However, it is also possible to provide the transmission gear drive with intermeshing gears, and the following step-type gearing with pulleys and toothed or flat belts that extend thereover.

The torque coupling that follows the electric drive motor can be an electromagnetic coupling, a fluid coupling, Or the like, and preferably has an adjustable transferable torque.

With the inventive apparatus for producing a rotational adjustment movement. It is possible to rotate the drive motor of the actuator during normal operation at a constantly uniform speed and direction of rotation without the requirement for regulation (or for a separate cooling). Thus, an economical standard electric motor can be used as the drive motor. In order to secure a workpiece, or to open the chuck that receives the workpiece, it is merely necessary, with the machine spindle stopped, to rotate the drive motor of the actuator in the appropriate direction of rotation. In contrast, a retightening is automatically effected by a slight rotation of the transmission shaft about the main shaft of the transmission gear drive until the state of equilibrium is again established between the torque transmitted from the torque coupling and the applied clamping force. The structural and control expense is accordingly extremely slight, and a straightforward application is also provided.

A further advantage is that the transmission gear drive and the step-type gearing can be entirely or partially embodied as belt drives. As a result, no lubrication problems arise, and operational noises of these gear mechanisms are maintained at a low level despite the occasionallY high speeds that are encountered. In addition, via the torque coupling, the clamping force that is to be exerted upon a workpiece that is to be clamped in can be easily adapted to respectively prevailing conditions.

Further specific features of the present invention will be described in detail subsequently.

DESCRIPTION OF PREFERRED EMBODIMENTS

Figure 2:
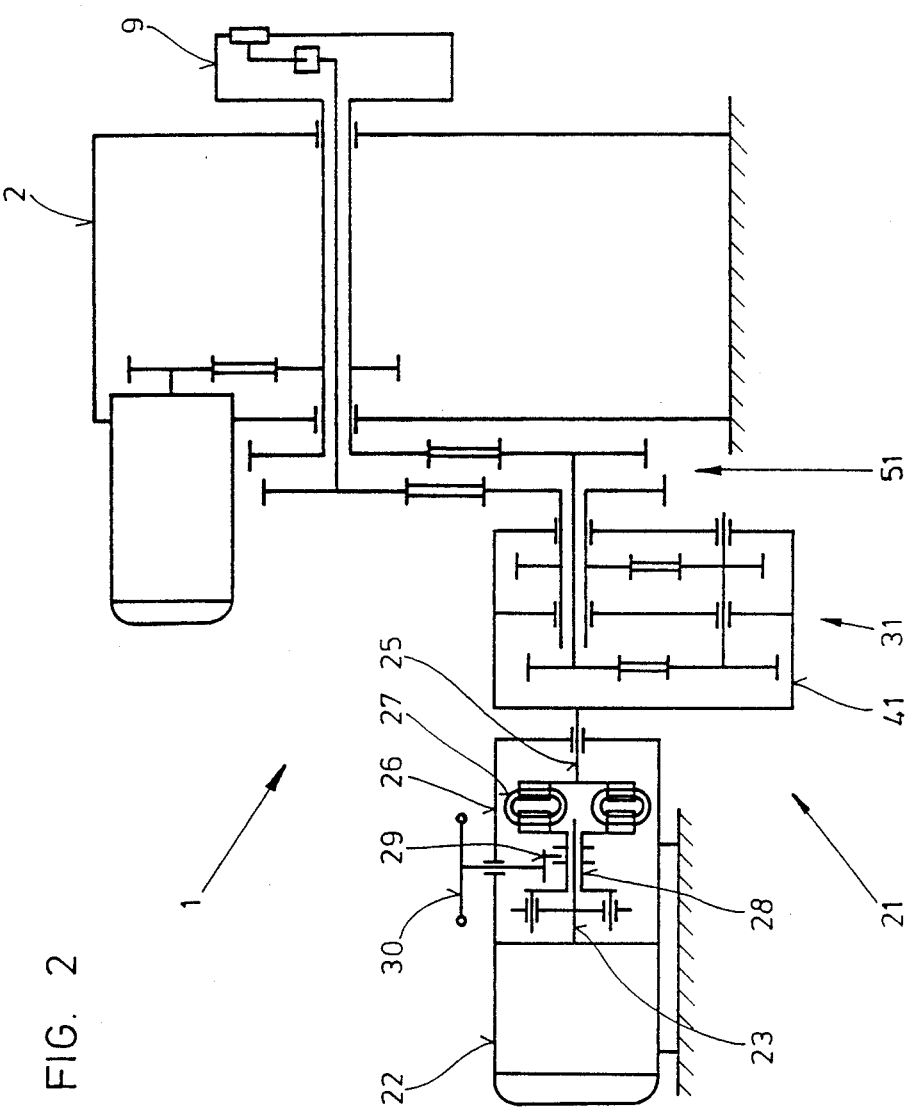
FIG. 2 is a view that shows a further exemplary embodiment of the torque coupling that is associated with the drive motor of the actuator of FIG. 1.
Figure 3:
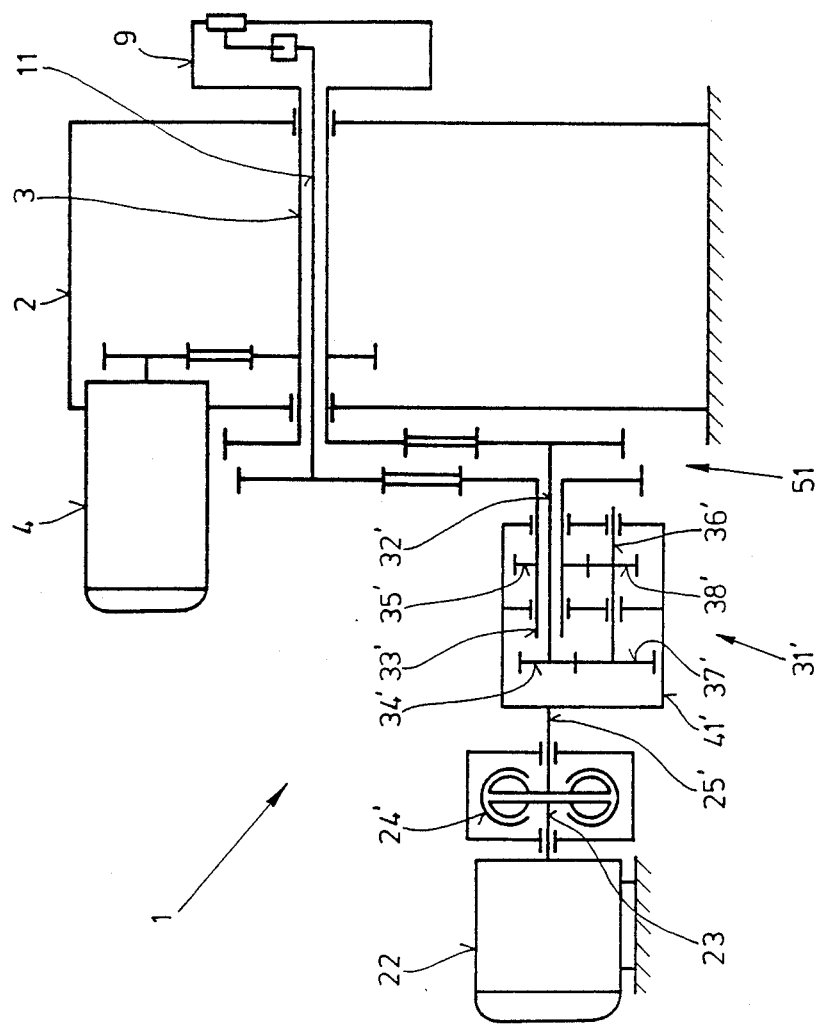
FIG. 3 is a view that shows another exemplary embodiment of the transmission gear drive of the actuator of FIG. 1.

Referring now to the drawings in detail, the apparatus 1 illustrated in FIGS. 1 to 3 serves for actuating or controlling the clamping the jaws 10, which are radially adjustably guided in a chuck body of a heavy-duty or power chuck 9 that is disposed on a turning machine 2. Via a guide member 12, the clamping jaws 10 are drivingly coupled with a rotatably driven adjustment member 11 that can be controlled by an actuator 21. A motor 4 is provided to drive the chuck 9, which is connected to a machine spindle 3. Via a drive pulley 6 and a flat belt or V-belt 8, the drive shaft 5 of the motor 4 is drivingly connected with a pulley 7 that is fixedly disposed on the machine spindle 3.

The actuator 21 comprises a drive motor 22, a torque coupling 24 that cooperates with the drive shaft 23 of the motor 22, a two-stage synchronized or synchromesh gear in the form of a transmission or reduction gear drive 31, and a step-type gearing 51. When the machine spindle 3 is stopped, the adjustment member 11 can be driven via the actuator 21 in order to open the power chuck 9 or in order to secure a workpiece between the clamping jaws 10, which are offset from one another by 120°. In addition, when the chuck 9 is rotating, the clamping force that is to be exerted by the clamping jaws 10 is maintained and any retightening that might be needed is undertaken automatically.

The transmission gear drive 31 is formed from central gears 34 and 35, which are fixedly mounted on a main shaft 32 and a hollow shaft 33 that centrally receives the main shaft 32, as well as from transmission gears 37 and 38, which are disposed on a transmission shaft 36, with the gears 34 and 37 on the one hand and 35 and 38 on the other hand being drivingly interconnected via belts 39 and 40. The transmission shaft 36 is rotatably supported, via bearings 43, in a housing 41 that in turn is supported on the central hollow shaft 33 via bearings 42. In addition, the housing 41 is connected to the drive shaft 25 of the torque coupling 24, which is disposed in a housing 26.

The step-type gearing 51 comprises a gear 52 that is disposed on the machine spindle 3, a gear 53 that is held on the adjustment member 11, as well as gears 54 and 55 that are fixedly mounted on the main shaft 32 and the central hollow shaft 33 and are drivingly connected via flat belts or V-belts 56 and 57 with the gears 52 and 53. The two reduction or transmission steps of the step-type gearing 51 correspond to the respectively coupled reduction steps of the transmission gear drive 31.

If a workpiece is to be secured in the power chuck 9, the drive motor 22 of the actuator 21 is turned on, with the machine spindle 3 being stopped. In this operating state, via the torque coupling 24, the housing 41 is driven and the transmission shaft 36 therefore rotates about the main shaft 32, which via the gear 54, the belt 56, and the gear 52 engages the stopped machine spindle 3. The drive energy received from the torque coupling 24 is transmitted via the housing 41, the transmission shaft 36, the gear 38, the belt 40 and gear 35, the central, hollow shaft 33 and the gear 55, the belt 57, and the gear 53 onto the adjustment member 11, and from there, via the guide member 12. To the clamping jaws 10. During a clamping process, the housing 41 rotates until a state of equilibrium can be achieved between the torque taken from the torque coupling 24 and the clamping force exerted upon the clamped-in workpiece. Thus, the respective clamping force can be selected in an easy manner with the aid of the torque coupling 24.

If, after termination of the clamping process, the machine spindle 3 is placed in operation, for example by turning the motor 4 on, all of the transmission members of the transmission gear drive 31 and of the step-type gearing 51 rotate. In this operating state, the housing 41 of the transmission gear drive 31 is engaged by the torque that acts upon the housing 41 via the torque coupling 24 and that is applied by the drive motor 22. In addition, since the respective reduction or transmission steps of the transmission gear drive 31 and of the step-type gearing 51 are the same, the housing 41 retains the position that it assumed upon completion of the clamping process. However, if the clamping force changes during normal operation, for whatever reason, the housing 41, since the torque transmitted by the torque coupling 24 is constant, is readjusted until the state of equilibrium is again established. Due to the rotation of the housing 41, and of the transmission shaft 36 connected therewith, the speed of the adjustment member 11 is slightly increased or reduced for a short period of time.

To open the power chuck 9, with the machine spindle 3 stopped, it is merely necessarY to reverse the direction of rotation of the drive motor 22 of the actuator 21. The housing 41 is again rotated about the main shaft 32 until the clamping jaws 10 rest against a stop in the final position, and a state of equilibrium is achieved between the torque delivered by the torque coupling 24 and the force exerted upon the stop by the clamping jaws 10.

In the embodiment illustrated in FIG. 2, a torque coupling 27 is disposed between the drive motor 22 and the housing 41 of the transmission gear drive 31. The transferable torque of the torque coupling 27 can be adjusted, so that the clamping force of the power chuck 9 could also be adjusted. Provided for this purpose is a sliding sleeve 28 that is drivingly connected with the drive shaft 23 of the drive motor 22 and with one half of the torque coupling 27. The sliding sleeve 28 can be shifted axially with the aid of an eccentric 29 that can be controlled by a hand wheel 30. By changing the distance between the two coupling parts of the electromagnetically effective torque coupling 27, the torque that is to be transferred at any given time can be adjusted.

In the embodiment illustrated in FIG. 3, a fluid coupling is provided as the torque coupling 24', and the transmission or reduction gear drive 31' is formed by spur gears 34', 35' and 37' and 38', which are disposed on the main shaft 32', the central hollow shaft 33', and the transmission shaft 36' respectively. By means of a shaft 25', the housing 41' is drivingly connected with the torque coupling 24'.

The present invention is, of course, in no way restricted to the specific disclosure of the specification and drawings, but also encompasses any modifications within the scope of the appended claims.

What I claim is:

1. In an apparatus for actuating the clamping jaws of a power chuck disposed on a shop machine, including means with which clamping jaws are radially displaceably guided in a driven chuck body and including means with which clamping jaws are coupled with a shiftable adjustment member that, to produce a rotational adjustment movement, is drivingly connected with drive means including an actuator that is formed from a stationary reversible electric drive motor and a gear mechanism that is drivingly connected to the output side of said drive motor via a torque coupling, comprising the improvement therewith wherein:

said gear mechanism is embodied as a two-stage synchronized gear in the form of a transmission gear drive having central gear that include means for rotatably mounted relationship of said central gears within one another include means with which said central gears are drivingly connected, via a step-type gearing, to a drive member of aid chuck and to aid adjustment member, which is coupled with said clamping jaws; said central gears of said transmission gear drive furthermore include means for drivingly and synchronously coupled relationship via two transmission gears that are fixedly disposed on a transmission shaft of said transmission gear drive, with said transmission shaft being mounted via means so as to be rotatable about said central gears, and means for engaging, in a load-dependent manner, a drive member of said torque coupling relative to said drive motor; mans with which said central gears and said transmission gears are coordinated with one another to form reduction stages that correspond to transmission stages of the following step-type gearing.

2. An apparatus according to claim 1, which includes means with which said transmission shaft of said transmission gear drive is rotatably supported by support housing means that includes means with which a drivingly connected relationship to said drive member of said torque coupling is provided.

3. An apparatus according to claim 1. in which said transmission gear drive includes a main shaft that carries one of said central gears and extends parallel to an axial direction of said drive motor of said actuator.

4. An apparatus according to claim 1, in which said reduction stages of said transmission gear drive, and said transmission stages of the following step-type gearing, are formed by pulleys about which extend belt means.

5. An apparatus according to claim 1, in which said reduction stages of said transmission gear drive are formed by intermeshing gears, and said transmission stages of the following step-type gearing are formed by pulleys about which extend belt means.

6. An apparatus according to claim 1, in which said torque coupling, which is connected to the output side of said drive motor, is embodied as an electromagnetic coupling.

7. An apparatus according to claim 6, in which the torque that can be transmitted from said torque coupling is adjustable via torque-adjusting means.

8. An apparatus according to claim 1, in which said torque coupling, which is connected to the output side of said drive motor, is embodied as a fluid coupling.

9. An apparatus according to claim 1, in which means for providing a magnetic alternating current field is provided with said torque coupling relative to said drive motor.

10. An apparatus according to claim 1, in which means are provided to make said adjustment member axially shiftable.

11. An apparatus according to claim 10, in which the transmission shaft is rotatably supported in a housing as an intermediate member which is drivingly connected with a drive member of the torque coupling.

12. An apparatus according to claim 1, which includes means with which the drive motor of the actuator, in order to maintain the clamping force and at the same time undertake a retightening if needed automatically by a slight rotation of the transmission shaft about the main shaft of the transmission gear drive until a state of equilibrium can constantly rotate at a constant speed and direction of rotation that are independent of the speed and rotation of the machine spindle, thereby always delivering a uniform torque free of any requirement for regulation as well as for a separate cooling.

* * * * *